United States Patent
Lindenfelzer et al.

(10) Patent No.: US 9,724,857 B2
(45) Date of Patent: Aug. 8, 2017

(54) COMPRESSION MOLDED POLYMERIC FOAM ARTICLES AND METHODS

(75) Inventors: Mark E. Lindenfelzer, Milton, MA (US); Jere R. Anderson, Newburyport, MA (US); Samuel E. Dix, Newburyport, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 13/046,614

(22) Filed: Mar. 11, 2011

(65) Prior Publication Data

US 2012/0231192 A1  Sep. 13, 2012

(51) Int. Cl.
*B29C 44/34* (2006.01)

(52) U.S. Cl.
CPC ...... *B29C 44/3461* (2013.01); *B29C 44/3469* (2013.01); *Y10T 428/1376* (2015.01)

(58) Field of Classification Search
CPC ..... B29C 44/381; B29C 44/388; B29C 43/34; B29C 47/004

USPC ....... 264/77, 51, 54, 416, 419, 1.29, 3.3, 13, 264/433, 452, 464, 37.26, 37.32, 45.9, 264/45.1, 638, 141, 151, 176, 415, 36.11, 264/321; 425/177, 345, 353, 406
See application file for complete search history.

(56) References Cited

U.S. PATENT DOCUMENTS

| | | | |
|---|---|---|---|
| 5,202,069 A * | 4/1993 | Pontiff | 264/51 |
| 6,284,810 B1 * | 9/2001 | Burnham et al. | 521/79 |
| 6,408,981 B1 * | 6/2002 | Smith | A61F 11/10 181/126 |
| 2006/0202375 A1 * | 9/2006 | Jenkins, Jr. | B29C 43/361 264/148 |
| 2011/0031059 A1 * | 2/2011 | Parish | A61F 11/08 181/129 |

* cited by examiner

*Primary Examiner* — Stella Yi
(74) *Attorney, Agent, or Firm* — Wolf, Greenfield & Sacks, P.C.

(57) ABSTRACT

Compression molded polymeric foam articles and methods are described herein. Equipment design and processing techniques may be controlled to form compression molded articles having desired characteristics.

19 Claims, 3 Drawing Sheets

COMPRESSION MOLDED POLYMERIC FOAM ARTICLES AND METHODS

FIELD OF INVENTION

The invention relates generally to polymeric foam and more particularly to compression molded polymeric foam articles and methods.

BACKGROUND OF INVENTION

Polymeric foams include a plurality of cells (or voids) formed within a polymer matrix. Microcellular foams (or microcellular materials) are polymeric foams which have very small cell sizes and high cell densities. By replacing solid plastic with voids, polymeric foams use less raw material than solid plastics for a given volume. Thus, raw material savings increase as the density of a foam decreases.

Compression molding is a common technique to make molded polymeric articles. The process can involve introducing a precursor within an open mold cavity. The mold cavity is closed with heat and pressure being applied to shape the precursor into the desired molded polymeric article.

It can be challenging to produce compression molded foam polymeric articles. For example, the heat and pressure applied during the compression molding process has a tendency to crush the cell structure of the foam.

Accordingly, a technique for producing a compression molded foam polymeric article having a quality cell structure would be desirable.

SUMMARY OF INVENTION

Compression molded polymeric foam articles and methods are provided.

In one aspect, a method of forming a compression molded foam article is provided. The method comprises conveying a stream of polymeric material and blowing agent in an extruder and introducing a portion of the stream into a mold cavity formed between mold portions to form a pellet. The pellet has an average cell size of less than 150 microns. The method further comprises compressing the mold portions to form a compression molded foam article having an average cell size of less than 150 microns.

In one aspect, a foam article is provided. The article comprises a polyolefin material. The article has a density between 0.5 g/cm$^3$ and 0.9 g/cm$^3$, and an average cell size of less than 150 micron. The article is compression molded.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All of the patent publications incorporated herein by reference are incorporated herein by references in their entireties. In cases of conflict or inconsistency between the disclosure of an incorporated reference and the present specification, the present specification should control.

DETAILED DESCRIPTION

Compression molded polymeric foam articles and methods are described herein. As described further below, equipment design and processing techniques may be controlled to form compression molded articles having desired characteristics. The techniques may involve extruding a foam pellet having a small cell size and, in some cases, an appropriate shape. The pellet is then compressed between two mold halves to form the molded article. Advantageously, the small cell size and density reduction may be retained throughout the compression molding process so that the resulting compression molded foam article also has a small cell size and a reduced density. Such articles can have excellent mechanical properties, while providing the materials savings associated with foam materials as compared to solid plastic articles. The articles may be used in a variety of applications including closures.

Figure 1:
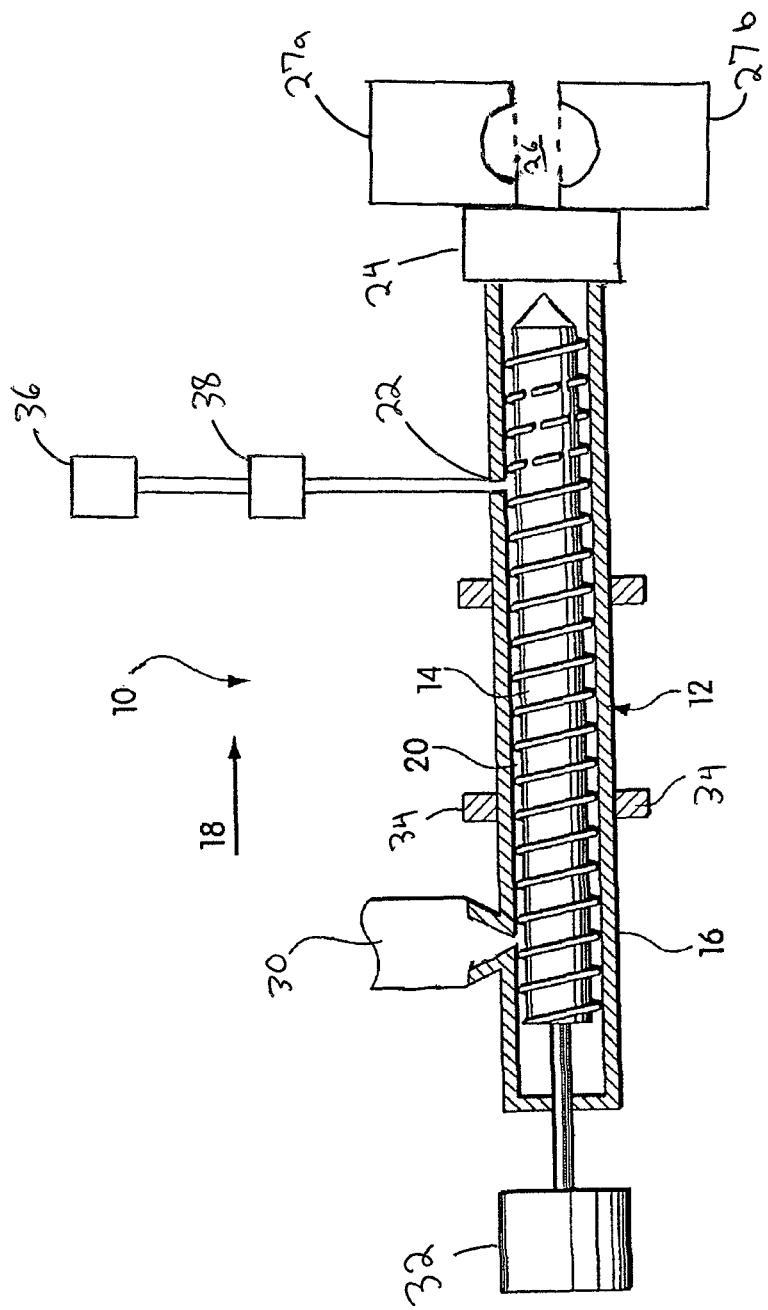
FIG. 1 shows a compression molding system according to an embodiment.

Referring now to FIG. 1, a compression molding system 10 is illustrated schematically according to some embodiments. The system includes an extruder 12 which houses a screw 14 that rotates within a barrel 16 to convey, in a downstream direction 18, polymeric material in a processing space 20 between the screw and the barrel. A blowing agent is introduced into the stream of polymeric material, for example, through a blowing agent port 22. The stream of polymeric material and blowing agent is extruded through a nozzle 24 fluidly connected to the processing space and fixed to a downstream end of the barrel. As described further below, the nozzle can be configured to extrude a pellet having a small cell size and other desired characteristics (such as a desired shape).

In the illustrated embodiment, the pellet is extruded into a space 26 (which may be exposed to atmospheric pressure conditions) between two mold halves 27a and 27b. A compression piston (not shown) acts to move one, or both, of the mold halves to subsequently compress the pellet to form a compression molded polymeric foam article within a mold cavity. In some embodiments, the pellet may have a similar shape as the compression molded article which can reduce the amount of flow of polymeric material within the mold cavity when forming the article. It has been observed that reducing the flow of polymeric material within the mold cavity can promote retention of cell size and density throughout the molding process, as described further below. The compression piston motion may be limited to reduce such flow.

The compression molded article may be recovered by opening the mold and the process may be repeated to form additional compression molded polymeric foam articles.

It should be understood that FIG. 1 depicts a representative compression molding system though a variety of modifications to the compression molding systems are possible.

The polymeric material may be introduced into the extruder using a standard hopper 30. The screw is connected, at its upstream end, to a drive motor 32 which rotates the screw within the barrel. Positioned along the barrel are temperature control units 34. The control units can be electrical heaters, can include passageways for temperature control fluid, and or the like. Units can be used to heat a stream of polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided. Temperature control units also can be supplied to heat the nozzle to which the extrusion system is connected.

In a typical process, polymeric material in solid form is introduced into the polymeric processing space from the hopper. The polymeric material is conveyed in a downstream direction as the screw rotates. Heat and shear forces arising from the rotating screw, act to soften the polymeric material. Eventually, a uniform fluid stream substantially free of air pockets is formed within the polymer processing space.

As noted above, the methods may involve using a blowing agent. In some preferred embodiments and as shown in FIG. 1, a physical blowing agent may be introduced into the stream of polymeric material through the blowing agent port. In other embodiments, a chemical blowing agent may be used. The chemical blowing agent may be used along with, or instead, of a physical blowing agent. The chemical blowing agents may be blended with the polymeric material. A blowing agent port may not be utilized when using a chemical blowing agent. Any of a wide variety of known chemical blowing agents may be used.

In embodiments in which a physical blowing agent is used, the physical blowing agent can be introduced from a blowing agent source 36 connected to the blowing agent port. Any of a wide variety of physical blowing agents known to those of ordinary skill in the art such as hydrocarbons, chlorofluorocarbons, nitrogen, carbon dioxide, and the like, and mixtures, can be used. In some preferred embodiments, the source provides carbon dioxide, or nitrogen, or a mixture thereof as a blowing agent. Blowing agents that are in the supercritical state in the extruder may be preferred in some embodiments, particularly supercritical carbon dioxide and/or nitrogen.

In some embodiments carbon dioxide is used in combination with other blowing agents such as nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent (e.g. carbon dioxide) that adds to or changes the blowing agent properties, or in combination with another agent that does not materially change the blowing process.

In embodiments that utilize physical blowing agents, the compression molded foam articles may be substantially free of residual chemical blowing agents or by-product of chemical blowing agent. Such articles may have certain advantages in some applications.

A pressure and metering device 38 typically is provided between the blowing agent source and the port. The metering device can be used to meter the blowing agent so as to control the amount of the blowing agent in the polymeric stream within the extruder to maintain a level of blowing agent at a particular level. In some preferred embodiments, the device meters the mass flow rate of the blowing agent. The blowing agent is generally less than about 10% by weight of polymeric stream and blowing agent; in some embodiments, the blowing agent may be less than about 5% by weight of polymeric stream and blowing agent; in some embodiments, the blowing agent may be less than about 2.5% by weight of polymeric stream and blowing agent; and, in some embodiments, the blowing agent may be less than about 1% by weight of polymeric stream and blowing agent.

When carbon dioxide is used as a blowing agent, it may be possible in some embodiments to use relatively low amounts of blowing agent such as less than about 2.5%, or less than about 1%, by weight of polymeric stream and blowing agent.

When nitrogen is used as a blowing agent, it may be possible in some embodiments to use very low amounts of blowing agent such as less than about 1.0%, less than about 0.5%, or less than about 0.1%, by weight of polymeric stream and blowing agent.

Although the blowing agent port can be located at any of a variety of locations along the barrel, according to some embodiments it is located just upstream from a mixing section of the screw and at a location of the screw where the screw includes unbroken flights. Blowing agent port configurations which may be suitable in some embodiments have been described in U.S. Pat. No. 6,284,810 which is incorporated herein by reference in its entirety. U.S. Pat. No. 6,284,810 also describes extrusion systems and processes which may be suitable in some embodiments. In some embodiments, one or more blowing agent ports may be utilized which include one or more orifices. However, certain systems may have a single blowing agent port and/or a single orifice.

In some embodiments, a single-phase solution of blowing agent and polymer may be formed in the polymer processing space in the extruder. Formation of a single-phase solution may be particularly conducive to forming a foam structure having small cell sizes, as described further below. The single-phase solution may be nucleated upon being extruded through the nozzle. For example, the solution may experience a rapid pressure drop which induces nucleation when passing through the nozzle.

It should be understood that, in some embodiments, a mixture of blowing agent and polymer which is not a single-phase solution may be extruded through the nozzle. Such embodiments, however, may not be as well-suited for forming small cells.

Figure 3:
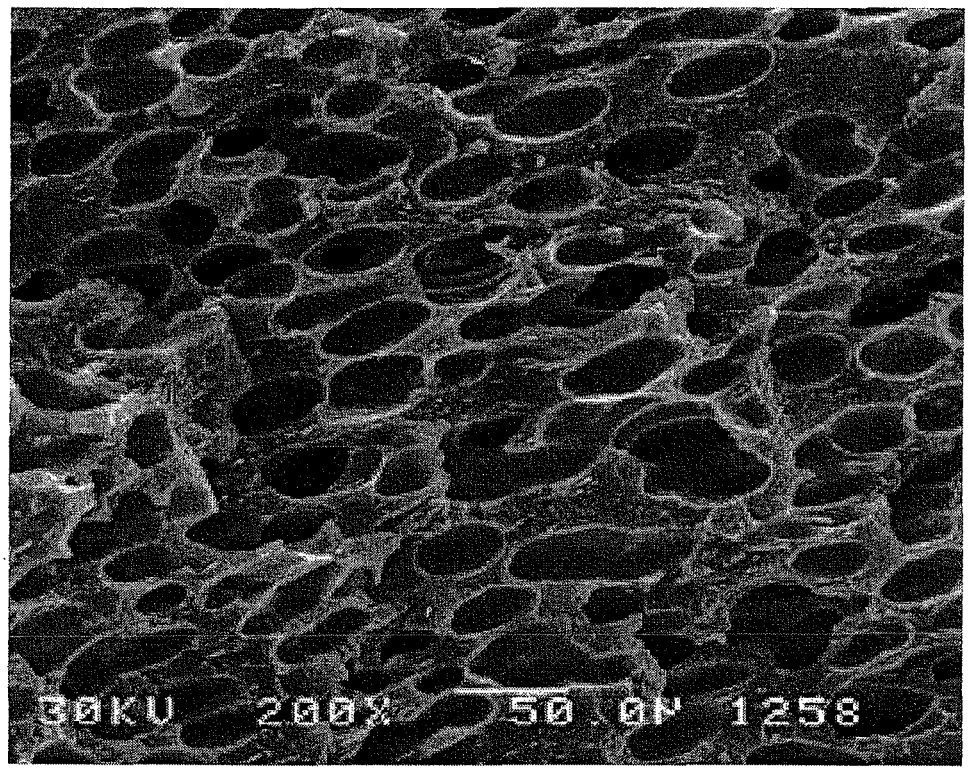
FIG. 3 shows an SEM of a compression molded closure produced according to techniques of the invention as described in the Example.

FIG. 3 illustrates nozzle 24 which may be used in connection with the compression foam molding system according to an embodiment. As noted above, the polymer and blowing agent stream is extruded through the nozzle. The nozzle includes an upstream end 40 and an outlet 42 at a downstream end 44 of the nozzle. The nozzle includes an inner passageway 46 which is fluidly connected the polymer processing space in the extruder and extends to the outlet.

In the illustrative embodiment, the inner passageway has a shape and dimensions to effect characteristics of the pellet. In general, the shape and dimensions may be selected to provide conditions that are conducive to forming desired characteristics (e.g., small cell size, desired shape). For example, in some embodiments, the inner passageway includes a cell nucleating portion and a cell growth portion downstream of the cell nucleating portion. The nucleating portion may have a cross-sectional dimension (d1) that is relatively small. For example, a cross-sectional dimension of the nucleating portion may be less than 0.50 inch (e.g., between 0.15 inches and 0.40 inches); and, in some cases, less than 0.30 inch (e.g., between 0.10 inches and 0.30 inches). In some cases, the inner passageway tapers inwardly to form the nucleating portion. The cell growth portion may have a cross-sectional dimension (d2) that is greater than that of the nucleating portion. For example, the cross-sectional dimension of the cell growth portion may be greater than 0.50 inch (e.g., between 0.50 inches and 0.75 inches). At least part of the cell growth portion may have a cross-section that increases approaching its outlet.

It should be understood that other nozzle configurations are possible.

The nozzle configuration can influence the nucleation of the polymer and blowing agent stream (e.g., single-phase solution of polymer and blowing agent). In particular, the nozzle configuration including the nucleating portion and cell growth portion has been observed to be very effective in creating nucleation conditions that contribute to the formation of a desired cell structure (e.g., small cell size) and pellet shape.

As noted above, the pellets may have a small cell size. For example, the average cell size of the pellet may be less than 150 micron. The average cell size can be determined by examining a representative number of cells using SEM analysis. In some embodiments, the average cell size may be less than 125 micron; in some embodiments, less than 100 micron; and, in some embodiments, less than 75 micron.

The pellets may have a range of density. The density of the pellet may be selected depending on the desired density of the compression molded product. The density may be, for example, between 0.40 g/cm$^3$ and 0.80 g/cm$^3$.

The pellets may be produced having a variety of different shapes. The shape of the pellet may depend, in part, on the shape of the compression molded article. As described above, in some embodiments, the pellet may have a similar shape as the compression molded article. For example, the pellet and the compression molded article may both have a concave shape (e.g., cup-like). Embodiments in which the pellet has a similar shape as the compression molded article may promote retention of cell size and density throughout the molding process.

As noted above, in some embodiments, the techniques described herein may advantageously retain the small cell sizes of the pellet through the compression molding cycle so that the compression molded articles also have a small cell size. In particular, the above-described technique of limiting the compression piston stroke and/or forming a suitably shaped pellet may contribute to the cell size retention. For example, the average cell size of the compression molded article may be within 25% of the average cell size of the pellet; and, in some embodiments, within 15% of the average cell size of the pellet. In some embodiments, the average cell size of the compression molded article may be less than 150 micron. The average cell size can be determined by examining a representative number of cells using SEM analysis. In some embodiments, the average cell size may be less than 125 micron; in some embodiments, less than 100 micron; and, in some embodiments, less than 75 micron.

In some embodiments, the compression foam molded articles may have a substantially closed cell structure. This means that a majority of the cells are not interconnected with other cells.

As noted above, in some embodiments, the techniques described herein may advantageously retain the density reduction associated with the pellet through the compression molding cycle so that the compression molded articles also have a density reduction as compared to a solid polymer article. In particular, the above-described technique of limiting the compression piston stroke coupled with forming a suitably shaped pellet may also contribute to the density reduction. For example, the average cell size of the compression molded article may be within 25% of the density of the pellet; and, in some embodiments, within 15% of the density of the pellet. This retention of density reduction is achievable even throughout the heat and pressure applied during the compression molding process which, in general, has a tendency to crush the cell structure of the foam thereby increasing density.

In general, the compression molded polymer foam articles may be produced over a wide range of density. The density of the articles may be selected depending on the requirements of the application in which the article is used. The density may be, for example, between 0.5 g/cm$^3$ and 0.9 g/cm$^3$.

The compression molded polymer foam articles may be produced in a variety of shapes. The shape generally depends on the application in which the article is used.

In general, the compression foam molded articles may be formed of any suitable polymeric material. Suitable polymeric materials include polyolefins such as polyethylene and polypropylene. Blends of more than one polymeric material, such as blends of polyolefins, may be suitable.

The compression molded articles (and, thus, the pellets) may include one or more types of additives. For example, the compression molded articles (and, thus, the pellets) may include a nucleating agent, colorants, and/or other processing aids. When present, the nucleating agent can be in the form of a particle or powder such as talc.

As noted above, the compression molded articles may have a number of desirable characteristics including excellent mechanical properties. The mechanical properties may include a high strengths and outstanding sealing capability. The foam structure also enables materials savings as compared to solid plastic articles. The compression molded articles may also have high quality surfaces which may be attractive in appearance and/or may be decorated as desired.

The desirable properties and characteristics enable the compression molded articles to be used in a variety of applications. In particular, the compression molded articles may be used in applications including closures.

The function and advantage of these and other embodiments of the present invention will be more fully understood from the examples below. The following examples are intended to illustrate the benefits of the present invention, but do not exemplify the full scope of the invention.

EXAMPLE

This example illustrates the production of a compression molded article according to techniques of the invention.

Figure 2:
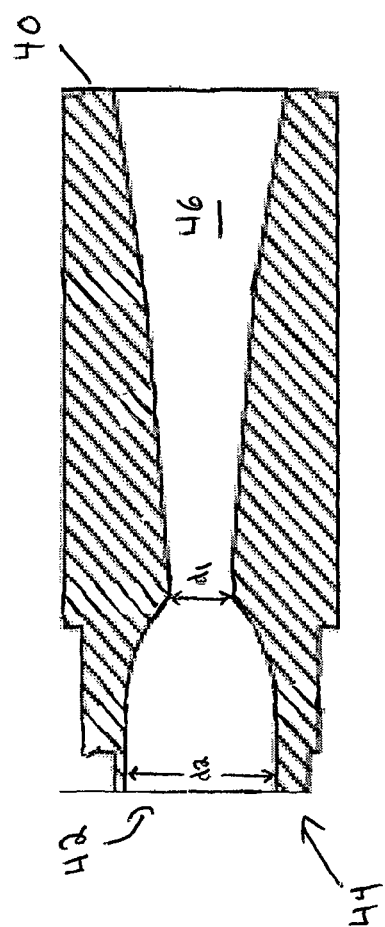
FIG. 2 shows a nozzle used in connection with the compression molding system according to an embodiment.

A stream of HDPE polymeric material was created in an extruder. Nitrogen was introduced through a blowing agent port into the stream to form a mixture of blowing agent and HDPE. The percentage of N$_2$ was less than 0.50% by weight of the mixture. The mixture was mixed within the extruder to form a single-phase solution. The solution was extruded through a nozzle similar to the one illustrated in FIG. 2 between two mold halves to form a cup-shaped pellet. The pellet had a density of 0.55 g/cm$^3$. The pellet was compressed between the two mold halves to form a compression molded article. The article was cup-shaped and suitable for use as a closure.

The compression molded article was characterized using SEM analysis. FIG. 3 is a copy of an SEM photo illustrating a representative section of the article. The average cell size was determined to be about 40 microns. The article had a density of about 0.77 g/cm³. The article had high quality surfaces and excellent mechanical characteristics.

What is claimed:

1. A method of forming a compression molded foam article comprising:
   conveying a stream of polymeric material and blowing agent in an extruder;
   introducing a portion of the stream into a mold cavity formed between mold portions to form a discrete pellet, wherein the pellet has an average cell size of less than 150 microns; and
   moving at least one of the mold portions to compress the discrete pellet to form a compression molded foam article having a density greater than that of the discrete pellet and an average cell size of less than 150 microns, wherein the compression molded foam article has a density between 0.5 g/cm³ and 0.9 g/cm³.

2. The method of claim 1, further comprising introducing a physical blowing agent into the polymeric material in the extruder to form the stream of polymeric material and blowing agent.

3. The method of claim 2, wherein the physical blowing agent comprises nitrogen.

4. The method of claim 2, wherein the physical blowing agent comprises carbon dioxide.

5. The method of claim 2, wherein the physical blowing agent is present in an amount less than about 2.5% by weight of polymeric stream and blowing agent.

6. The method of claim 1, wherein the blowing agent is a chemical blowing agent.

7. The method of claim 1, comprising introducing the portion of the stream into the mold cavity comprising extruding the portion through a nozzle to form the discrete pellet.

8. The method of claim 7, wherein the nozzle has an inner passageway that includes a cell nucleating portion and a cell growth portion downstream of the cell nucleating portion.

9. The method of claim 8, wherein the cell growth portion has a cross-sectional dimension that is greater than a cross-sectional dimension of the cell nucleating portion.

10. The method of claim 1, wherein the pellet and the compression molded foam article have a similar shape.

11. The method of claim 10, wherein the shape is a cup-like shape.

12. The method of claim 1, wherein the pellet and the compression molded foam article have an average cell size of less than 100 micron.

13. The method of claim 1, wherein the average cell size of the compression molded foam article is within 25% of the average cell size of the discrete pellet.

14. The method of claim 1, wherein the density of the compression molded foam article is within 25% of the density of the discrete pellet.

15. The method of claim 1, further comprising forming a single-phase solution from the stream of polymeric material and blowing agent in the extruder.

16. The method of claim 1, wherein the compression molded article is a closure.

17. The method of claim 1, wherein the polymeric material comprises a polyolefin.

18. The method of claim 1, wherein the polymeric material comprises polyethylene.

19. The method of claim 1, wherein the compression foam molded article has a substantially closed cell structure.

* * * * *